United States Patent
Ogawa

(10) Patent No.: US 6,730,261 B2
(45) Date of Patent: May 4, 2004

(54) PROCESSES FOR PRODUCING HOLLOW MOLDED ARTICLES

(75) Inventor: Masaaki Ogawa, Kobe (JP)

(73) Assignee: Tigers Polymer Corporation, Osaka (JP)

( * ) Notice: Subject to any disclaimer, the term of this patent is extended or adjusted under 35 U.S.C. 154(b) by 302 days.

(21) Appl. No.: 09/873,295

(22) Filed: Jun. 5, 2001

(65) Prior Publication Data
US 2002/0066981 A1 Jun. 6, 2002

(30) Foreign Application Priority Data
Dec. 6, 2000 (JP) ........................................ 2000-371021

(51) Int. Cl.[7] .............................................. B29C 49/50
(52) U.S. Cl. ...................................... 264/536; 425/527
(58) Field of Search ............................ 264/536; 425/527

(56) References Cited

U.S. PATENT DOCUMENTS 3,892,513 A * 7/1975 Mehnert et al. ............. 425/525
5,617,768 A * 4/1997 Palazzolo ....................... 82/47
6,228,317 B1 * 5/2001 Smith et al. .................. 264/521

* cited by examiner

Primary Examiner—Suzanne E. McDowell
(74) Attorney, Agent, or Firm—Pillsbury Winthrop LLP

(57) ABSTRACT

The blow-molded articles having an open end is produced by the steps of; setting a resin parison in cavity formed by a pair of metal mold members, blowing a pressurized gas into the resin parison to form an intermediate molded article, and cutting a predetermined part of the intermediate molded article with forward or backward movement of a cutting means. The cutting means is attached to the one member of the metal mold members and movable reciprocally in a cross direction relative to the longitudinal or axial direction of the metal mold members. The cutting means may be guided movably along a groove or slit formed in the metal mold members.

11 Claims, 5 Drawing Sheets

PROCESSES FOR PRODUCING HOLLOW MOLDED ARTICLES

FIELD OF THE INVENTION

The present invention relates to a process and an apparatus for producing a hollow molded article by a blow molding process. More specifically, the present invention directs to a process and an apparatus for production of hollow molded articles such as resin ducts and hoses as a final product by cutting unnecessary portions of an intermediate molded article, particularly, by cutting an end of the intermediate molded article in a mold intermittently or successively in a blow-molding step.

BACKGROUND OF THE INVENTION

A cylindrical hollow article such as resin tube, hose and duct is conventionally produced by blow-molding a molten resin parison in a mold. The blow-molding processes comprise a step for setting a resin parison excluded from a die in a cavity formed by a pair of metal mold-members, a step for closing molding members, and a step for blowing a pressurized air into the resin parison to expand and form a hollow product. The molding of such hollow articles produces unnecessary portions or sites at the ends of the final product. Thus, the unnecessary portion in the final product is usually formed at the closed or narrow end of the final product.

Therefore, after taking out the intermediate hollow product from the metal mold, the unnecessary portion of the intermediate hollow product is cut manually by using a cutting means such as knife to produce a cylindrical hollow product. However, this cutting operation increases a production cost, and forms an irregular end surface on the cutting face, since the manual cutting operation is conducted individually outside the metal mold of the blow-molding apparatus. Thus, the finishing process for the cut irregular face is required, and the productivity of the hollow articles would be reduced.

SUMMARY OF THE INVENTION

It is, therefore, an object of the present invention to provide a process and an apparatus for producing a hollow product or article by cutting efficiently an unnecessary portion(s) of an intermediate hollow product in a molding process without cutting operations after blow-molding.

It is another object of the present invention to provide a process and an apparatus for producing a hollow product or article with improving productivity and reducing production cost.

The inventor of the present invention did intensive investigation to achieve the above objects, and found that use of a cutting means movable forwardly and backwardly in a metal mold relative to an intermediate product improves the cutting efficiency of unnecessary portions of the intermediate product to produce high quality hollow products stably. The present invention is based on the above finding.

Thus, a process for producing a hollow molded article having an open end by blow-molding method, which comprises a setting step for setting or putting a resin parison in cavity formed by a pair of metal mold members, a blowing step for blowing a pressurized gas (a compressed gas) into the resin parison to form an intermediate molded article, and a cutting step for cutting a predetermined part or section (i.e. cutting site) from the intermediate molded article with forward or backward movement of a cutting means which is movable crossly the cavity. In the process, the predetermined part or portion of the intermediate molded article is cut with a cutting means which is attached movably to the one member of the metal mold members. The cutting means may be movable reciprocally in a cross direction relative to the longitudinal or axial direction of the cavity or the metal mold members. The cutting means may be guided movably along a groove or slit formed in the metal mold members, and the predetermined part (or cutting site) of the intermediate molded article is cut with the cutting means The cutting means may comprise a blade being crossable (traversable) in an across direction relative to the longitudinal or axial direction of the intermediate molded article to be cut, and at least one end of the intermediate molded article is cut by the blade of the cutting means. The invention further discloses a process for cutting an unnecessary portion(s) of a hollow molded article in a metal mold. This process may comprise setting a resin parison in cavity formed by a pair of metal mold members, blowing a pressurized gas into the resin parison for expansion or inflation to form an intermediate molded article, and cutting a predetermined part or portion of the intermediate molded article with forward movement of a blade of a cutting means which is movable crossly the cavity.

A blow-molding apparatus of the invention is used for producing a hollow molded article. The apparatus may comprise a pair of metal mold members which are openable or closable each other and are formable a cavity for accommodating a resin parison, a blowing means for blowing a pressurized gas into the resin parison to form an intermediate molded article, a cutting means, which is movable crossly the cavity, for cutting a predetermined part (i.e. cutting site) of the intermediate molded article, and a reciprocating means for reciprocating the cutting means.

The inner wall of the metal mold members may have a groove or slit extending to a cross direction relative to the axial direction of the intermediate molded article, and the cutting means may comprise a cutter unit for cutting the intermediate molded article and an actuating means (e.g. cylindrical actuating means) for actuating the cutter unit forward or backward direction along the groove or slit. The groove or slit may be formed at a position of the inner wall corresponding to an end or edge of a final molded article. Further, the cutter unit has a various blade such as a circular hollow blade being acceptable the setting or accommodation of the resin parison, at least an inclined or curved blade which contacts pointedly or linearly substantially with the surface of the intermediate molded article, and so on. The blow-molding apparatus may further comprise a stopper being displaceable forward or backward against (or along axial direction of) an end of the resin parison and closable tightly the end of the resin parison in association with the mold members, and a control unit for controlling the forward or backward movement of the cutting means in response to the backward or forward movement of the stopper relative to the intermediate molded article. In the operations by the control unit, the forward displacement of the stopper regulates the advancement of the cutting means and the backward displacement of the stopper allows to move the cutting means forward.

DETAILED DESCRIPTION OF THE INVENTION

Figure 1:
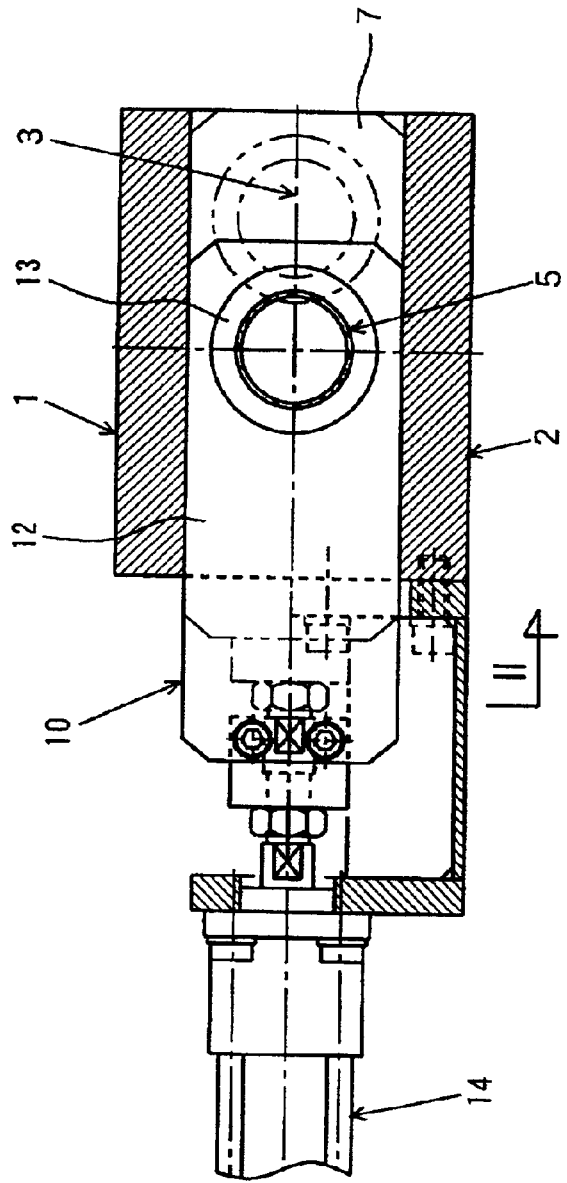
FIG. 1 is a schematic sectional side view showing one embodiment of a metal mold in a cutting step of the present invention.
Figure 2:
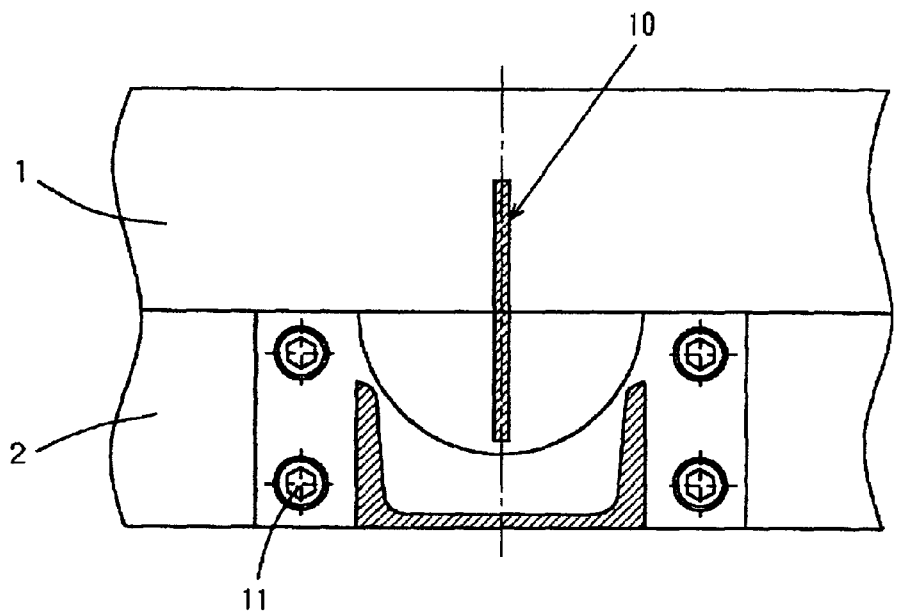
FIG. 2 is a schematic sectional view taken along line II of FIG. 1.
Figure 3:
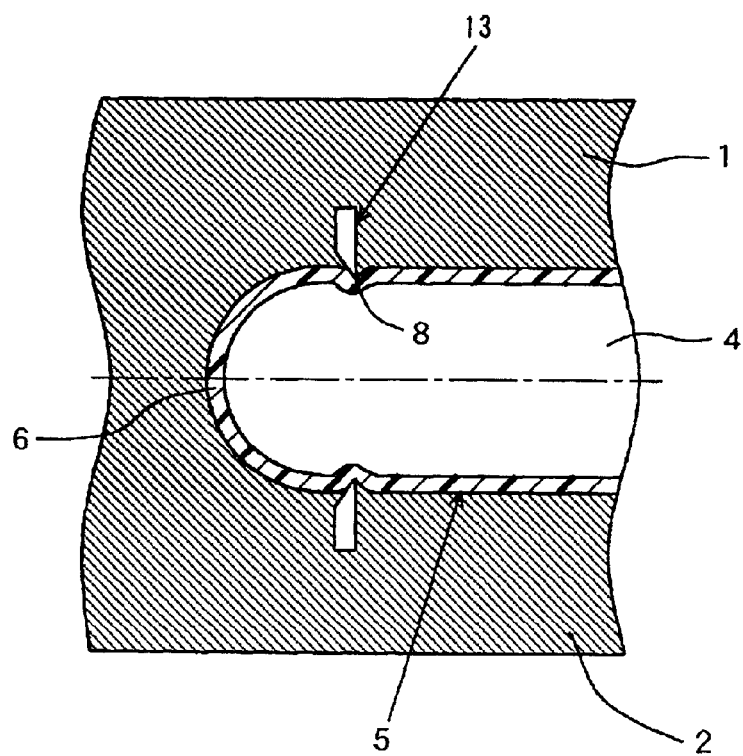
FIG. 3 is a partially fragmentary sectional view of the metal mold showing an end portion of an intermediate molded article.

With reference to Figures, the preferred embodiments of the present invention will be illustrated. FIGS. 1–3 show one embodiment of the present invention. FIG. 1 shows a schematic sectional side view of a metal mold in the cutting step of the present invention, FIG. 2 shows a schematic sectional view taken along line II of FIG. 1, and FIG. 3 is a partially fragmentary sectional view of the metal mold showing an end portion of an intermediate molded article.

A metal mold comprises a pair of metal mold members 1 and 2 (i.e. an upper metal mold member 1 and a lower metal mold member 2) which may be closely contacted with each other to form a parting line 3. The metal mold members 1 and 2 are separable or openable and closable each other, and form a cavity 4 for accommodating a molten resin parison by closing operation. The pair of the metal mold members 1 and 2 closes tightly the both ends of the resin parison. After closing the metal mold members 1 and 2, a pressurized gas is blown or introduced into the resin parison to expand the resin parison for forming an intermediate hollow molded article or product 5 having a shape corresponding to the configuration of the cavity 4.

A cutting tool 10 as a cutting means having a cutter unit 12 is attached or secured to one metal mold member 2 (i.e. the lower metal mold member) of the members with a bolt 11, and the cutter unit 12 is movable reciprocally in an across direction (particularly, perpendicular direction) relative to an axial or longitudinal direction of the cavity 4 or the hollow molded product 5. In more detail, on or at a predetermined inner site (e.g. inner wall site) of the metal mold members 1 and 2 corresponding to a cutting site 8 where an unnecessary portion(s) of the intermediate molded product is cut, a groove 7 or slit is formed as a space for disposing slidably the cutter unit 12. The groove 7 or slit extends to a cross direction relative to the axial direction of the intermediate molded article 5, and the cutter unit 12 is disposed movably in the groove 7 or slit. Further, the movement or displacement of the cutter unit 12 is controlled by an oil hydraulic cylinder 14 as a reciprocating means or an actuating means. Thus, the cutter unit 14 is movable crossly the cavity and the forward or backward movement along the groove 7 or slit can be conducted by actuating the cylinder 14 as the reciprocating means for reciprocating the cutting means.

The cutter unit 12 has a plate-like configuration and is scooped out at an area to form a circular inner blade 13 having a keen-edged inner blade. The circular inner blade 13 is somewhat projected inwardly into the cavity 4 from the inner surface of the mold members 1 and 2 for forming the intermediate molded product 5 having the cutting site 8. Thus, the axis of the circular inner blade 13 is coincided substantially with the axis of the cavity 4 or molded product 5, and the inner diameter of the circular inner blade 13 is somewhat smaller than that of the cavity 4. Thus, the blade is arranged so as to cross the longitudinal or axial direction of the intermediate molded article to be cut.

According to the apparatus, a blow-molded hollow article having an open end can be produced by cutting the intermediate molded article in the blow-molding process. Firstly, a molten resin parison excluded from a die by an extruder (not shown) is set or arranged on the metal mold member 2. In this operation, an end portion of the parison corresponding to the unnecessary portion 6 of the intermediate molded article 5 is inserted in or disposed on the inner arc blade 13 of the cutter unit 12 which is connected to the metal mold member 2.

After setting the resin parison having a given length in the space formed in the inner side of the metal mold member 2, the metal mold member 2 is closed by the other metal mold member 1 tightly to accommodate and hold the resin parison into the cavity 4 of the metal mold members 1 and 2, a pressurized (compressed) air is blown into the resin parison by a blowing means such as an air nozzle (not shown) to expand and press the resin parison against the inner surface of the metal mold. Thus, the intermediate molded article 5 having an outer configuration corresponding to the cavity 4 can be formed.

With molding the intermediate molded article 5, the circular inner blade 13 of the cutter unit 12 encroaches into the wall of the intermediate molded article 5 at the cutting site 8. After blow-molding, the intermediate molded article 5 may be cooled and preferably the introduced pressurized air may be exhausted from the parison. In the cutting step, the cutter unit 12 is actuated and advanced forward by the oil hydraulic cylinder 14 in the cross direction relative to the cavity 4 to reach a position shown by a two-dot chain line in FIG. 1. The advancement or forward movement of the blade 13 efficiently and accurately cuts the wall of the intermediate molded article 5 at predetermined part or portion (i.e. the cutting site 8) with focusing the cutting force to the cutting site 8, since the blade 13 has been encroached or entered into the wall of the intermediate molded article 5. Thus, the unnecessary portion 6 (e.g. end or edge) in the final product can be cut and separated from the final hollow product with ease by a simple manner.

Following the cutting step, the metal mold member 1 is separated from the metal mold member 2 to take out the final hollow product wherein the unnecessary portion was cut. In such process, since the blow-molding step and the cutting step can be conducted successively or intermittently, any conventional post-processing step for the product having an open end such as a resin duct can be omitted.

Figure 4:
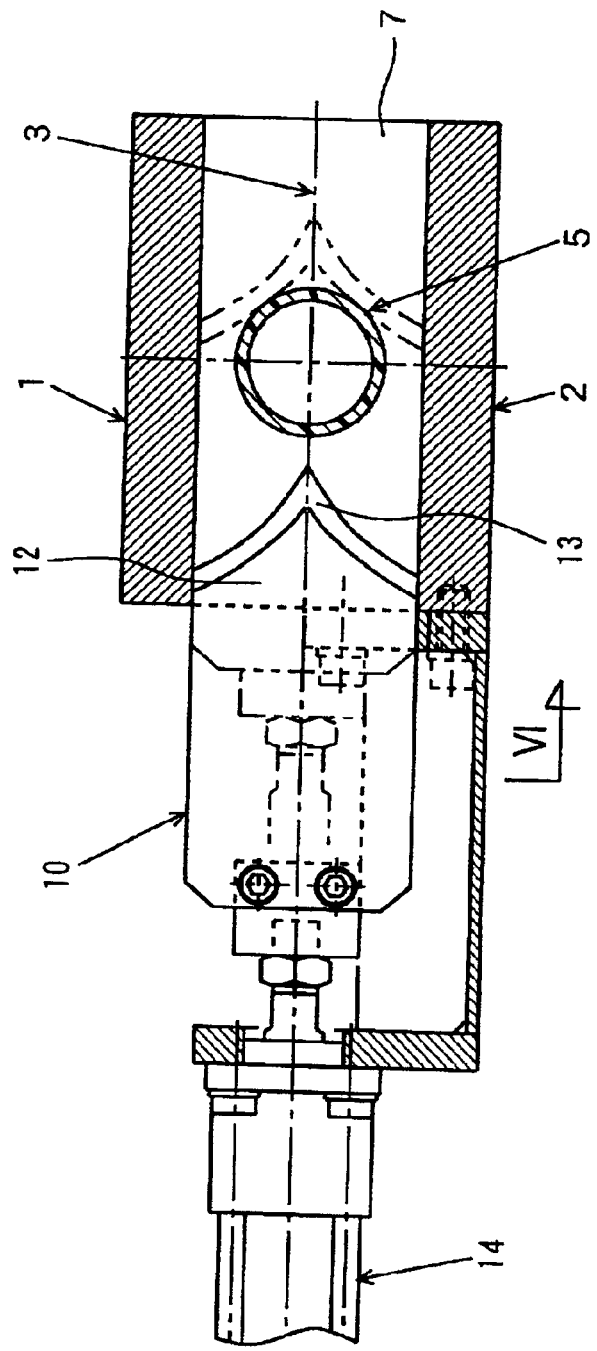
FIG. 4 is a schematic sectional side view showing another embodiment of a metal mold in a cutting step of the present invention.
Figure 5:
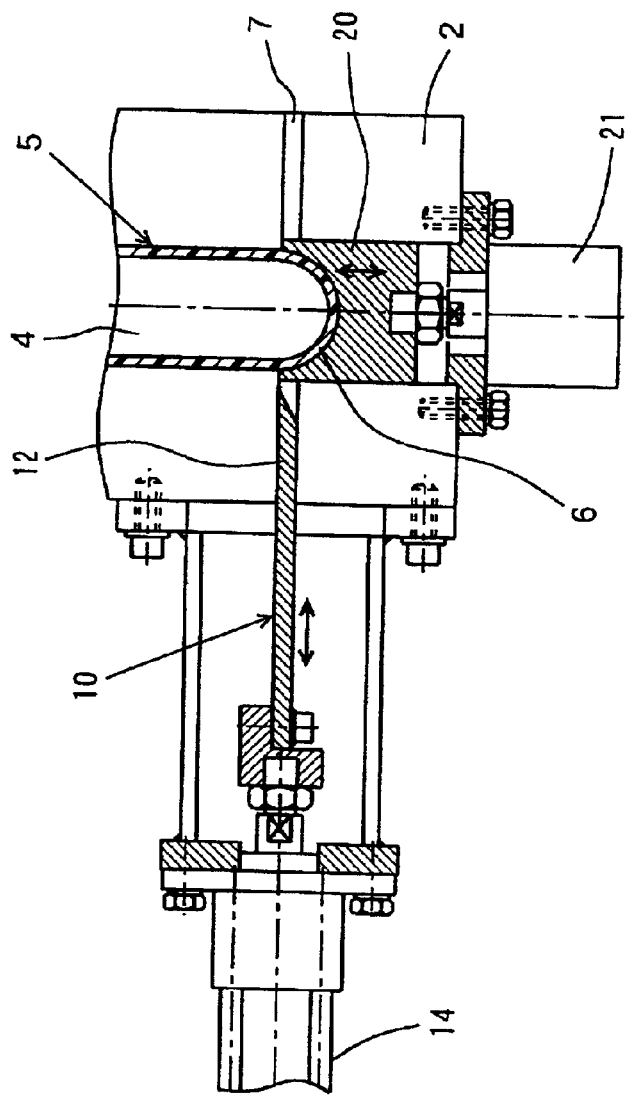
FIG. 5 is a schematic plane view showing end portion of the metal mold.
Figure 6:
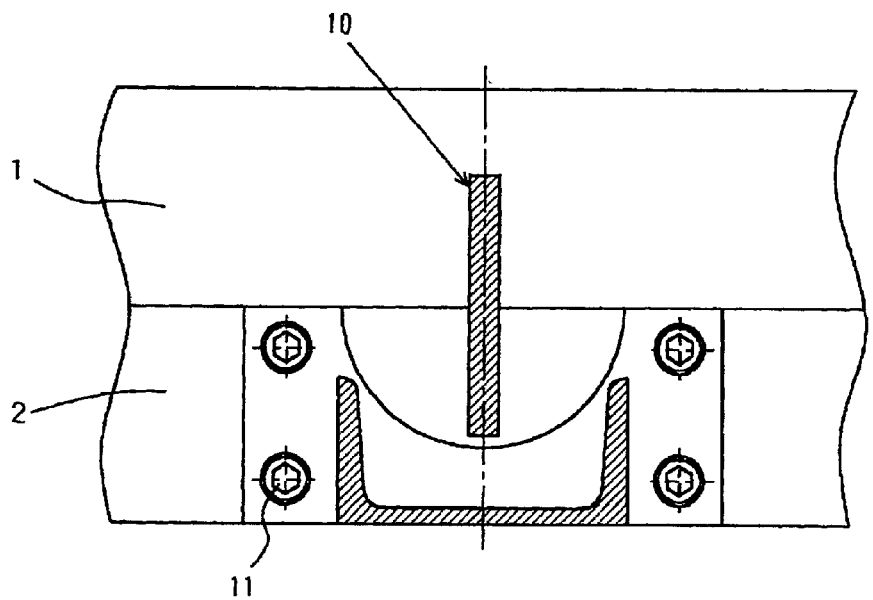
FIG. 6 is a schematic sectional view taken along line VI of FIG. 4.
Figure 7:
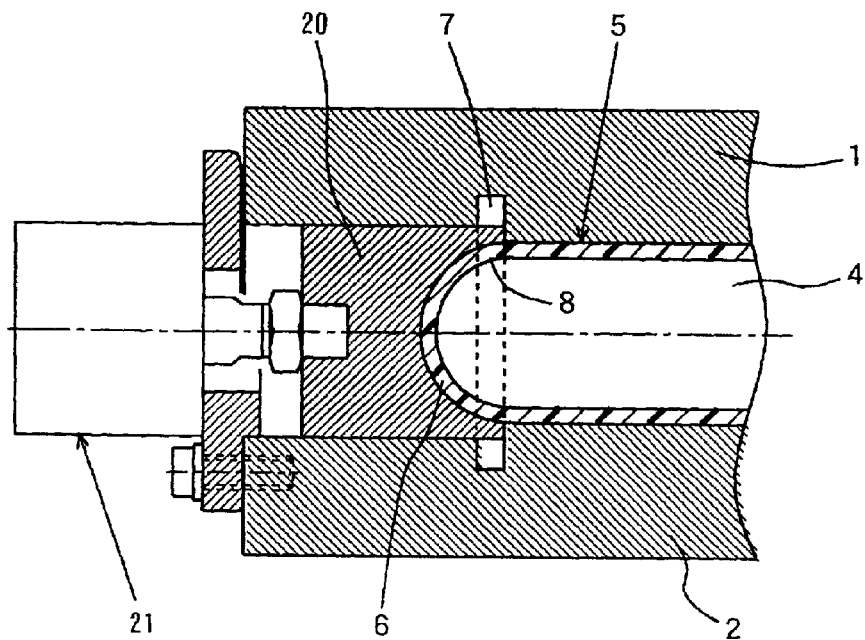
FIG. 7 is a partially fragmentary sectional view of the metal mold showing an end portion of an intermediate molded article.

Now reference to FIGS. 4–7, another embodiment of the invention will be described in detail. FIG. 4 is a schematic sectional side view showing another embodiment of a metal mold in a cutting step of the present invention, FIG. 5 is a schematic plane view showing end portion of the metal mold, FIG. 6 is a schematic sectional view taken along line VI of FIG. 4, and FIG. 7 is a partially fragmentary sectional view of the metal mold showing an end portion of an intermediate molded article.

As same as in FIGS. 1–3, a separable metal mold comprises a pair of metal mold members 1 and 2 (i.e. an upper metal mold member 1 and a lower metal mold member 2) which may be closely contacted with each other to form a parting line 3. The metal mold members land 2 accommodate a molten resin parison and form a cavity 4 for molding an intermediate molded hollow article or product 5 by blowing a pressurized gas and expanding the resin parison. In this embodiment, one end of the longitudinal linear cavity 4 formed by the metal mold members 1 and 2 is not closed even if closing operation of the metal mold members, and a stopper 20, which is displaceable forward or backward along axial direction of the end of the linear cavity by an oil hydraulic cylinder 21, is disposed at the end side of the metal mold members 1 and 2. That is, the stopper 20 is closable of one end of the resin parison disposed in the longitudinal linear cavity 4 in association or cooperation of a pair of the metal mold members 1 and 2 to form an unnecessary portion 6 of the intermediate molded article 5. The pair of the metal mold members 1 and 2 closes tightly the other end of the resin parison and defines the outer side surface of the intermediate molded article 5. Thus, the movement or displacement of the stopper 20 is controlled by connecting the stopper 20 to the oil hydraulic cylinder 21 attached to one metal mold member 2 (i.e. the lower metal mold member).

Further, as same as in the embodiment mentioned above, a cutting tool 10 as a cutting means having a cutter unit 12 is attached movably to one metal mold member 2 (i.e. the lower metal mold member) with a bolt 11, and the cutter unit 12 is movable in an across direction (particularly, perpendicular direction) relative to an axial direction of the cavity 4 or the hollow molded product 5. In more detail, at a predetermined site of the inner surface (e.g. inner wall) of the metal mold members 1 and 2 corresponding to a cutting site 8 where an unnecessary portion(s) of the intermediate molded product is cut, a groove 7 or slit is formed as a space for slidably disposing the cutter unit 12. The cutter unit 12 is disposed movably in the groove 7 or slit and the movement or displacement of the cutter unit 12 is controlled by an actuation of an oil hydraulic cylinder 14. Thus, the cutter unit 12 is movable forward or backward along the groove 7 or slit by actuating the cylinder 14.

The cutter unit 12 is formed in a plate-like configuration having a triangular keen-edged blade 13 at one end. The blade 13 at an original position is in the groove (or slit) 7 which is isolated or interrupted from the cavity 4 by the stopper 20. To be specific, the forward displacement of the stopper 20 closes the end of the resin parison and regulates or inhibits the advancement of the blade 13 of the cutting means at the original position, and the backward displacement of the stopper 20 allows to move the blade 13 of the cutting means forward to an advanced position for cutting the end of the intermediate molded product 5. These operations can be controlled by a controlling means. Thus, the apparatus further provides with a control unit for controlling the forward or backward movement of the cutting means in response to the backward or forward movement of the stopper 20 relative to the intermediate molded article.

According to the above apparatus, the end or edge (unnecessary portion) of the intermediate molded article can be efficiently cut in the metal mold by the blow-molding process. Thus, a molten resin parison excluded from a die by an extruder (not shown) is set or arranged along the inner concave of the metal mold member 2. After setting the resin parison having a given length on the metal mold member (the lower metal mold member) 2, the metal mold member (the upper metal mold member) 1 is closed tightly with the other metal mold member 2, and the stopper 20 is actuated forward against (or along axial direction of) the end of the parison to close the end of the cavity 4 or the end of the resin parison. With the forward movement of the stopper 20, the tip or edge of the stopper 20 is passed through the groove (or slit) 7 to contact with the edge of the metal mold members 1 and 2, and the closed space "cavity 4" is formed by the metal mold members 1 and 2 and the stopper 20 to accommodate and hold the resin parison in the cavity 4. A pressurized air is blown into the resin parison by an air nozzle (not shown) to expand and press the resin parison against the inner surface of the metal mold. Thus, the intermediate molded article 5 having an outer configuration corresponding to the cavity 4 can be formed.

After blow-molding, the intermediate molded article 5 is cooled and preferably the introduced pressurized air is exhausted from the parison. In the cutting step, a control unit controls the forward or backward movement of the cutting means in response to the backward or forward movement of the stopper relative to the intermediate molded article. The stopper 20 is moved backward by actuating the oil hydraulic cylinder 21 to open the groove 7 which is communicable with the cavity 4 through the wall thickness of the intermediate molded article 5. In response to the backward movement of the stopper 20, the cutter unit 12 is actuated and advanced forward by the oil hydraulic cylinder 14 in the cross direction relative to the axis direction of the cavity 4 to reach a position shown by a two-dot chain line in FIG. 4. The advancement of the cutter unit 12 causes encroachment of the blade 13 into the wall, and further advancement of the blade 13 cuts efficiently and accurately the wall thickness of the intermediate molded article 5 at the cutting site 8 with concentrating the cutting force to the cutting site 8. Thus, the unnecessary portion 6 in the final product can be cut and separated from the final hollow product with ease by a simple manner.

Following the cutting step, the metal mold members 1 and 2 are separated or opened each other to take out the final hollow product. These steps or operations can be conducted repeatedly or intermittently by use of the automatic controlling means.

In the present invention, any actuating means or unit for the cutter tool can be used, and the actuating means includes various reciprocally movable means or mechanism such as an air hydraulic cylinder and the like in addition to the oil hydraulic cylinder. As the actuator for the stopper, various actuating means can also be utilized. The preferred actuating means includes an cylindrical actuating means.

In accordance with the shape or configuration of the final product, the cutting site may be selected suitably. The intermediate molded article may be cut at one end or edge (unnecessary portion) or both ends of a hollow molded article.

The blade of the cutter unit may have various shapes in accordance with the shape of the intermediate molded article to be cut, and the blade (or tip blade) may be a flat or linear blade, an inclined blade, a crescent or semicircular blade or the like. For improving cutting efficiency, the blade has usually at least an inclined or curved blade which contacts pointedly (or in point) or linearly substantially with the surface of the intermediate molded article at the cutting site.

The metal mold practically accommodates at least side wall of the parison, and the stopper may be preferably displaceable or reciprocal forward or backward against (or along axial direction of) an end of the resin parison and closable tightly the end of the resin parison in association or cooperation with movement of the mold members.

The cutting direction by the cutting means is not particularly restricted and may be an oblique direction, a perpendicular direction relative to the axial direction of the molded article to be cut.

The blow-molding apparatus essentially only comprises a pair of metal mold members, a blowing means for blowing a pressurized gas into the resin parison, a cutting means, and a reciprocating means for reciprocating the cutting means. Further, the control unit as a controlling means may comprise a first actuating unit or circuit for actuating a cylinder to advance a cutting means forward from an original position to a given advanced position for cutting a predetermined site of the intermediate molded article, a second actuating unit or circuit for actuating the cylinder backward after completion of the cutting operation, and a reset unit or circuit for resetting the cylinder at the original position.

When the apparatus is provided with the stopper, the control unit may further comprise a unit or circuit for controlling the forward movement or advancement of the stopper relative to the end of the parison in response to the closing operation of the metal mold members, in addition to a unit or circuit for controlling the forward or backward movement of the cutting means in response to the backward or forward movement of the stopper. In the operations by the control unit, the stopper may inhibit the cutting operation by a cutting means at the advanced position, and allow to cut the molded article by the cutting means at the backward position.

The closing or opening operation of the metal mold member may be carried out manually by hand or automatically by the control unit, and the blowing operation may be conducted by use of the control unit. Thus, the control unit may further comprise a unit sending a closing signal to an actuating unit for closing the metal mold members in response to the start signal after completion of the setting of the parison in or on the one metal mold member, a unit sending a blowing signal to the blowing unit for blowing a pressurized gas into the parison in the cavity after completion of the closing operation, and a unit sending an opening signal for opening the metal mold members in response to completion of the cutting operation.

The molten resin parison can be various thermoplastic resins such as olefinic resins (e.g. a polyethylene, a polypropylene, an ethylene-propylene copolymer, an ethylene-vinyl acetate copolymer), polyvinyl chloride resins, styrenic resins, (meth)acrylic resins, polyester resins, polycarbonate resins and polyamide resins. The parison may have a single-layer structure or a multi-layer structure.

The present invention can apply to a blow-molding process for producing various resin hollow product, and the hollow product may have any two- or three-dimensional configuration such as a linear, a bending or curved shape.

According to the present invention, labor savings can be realized and the generation of defective or non-conforming articles can be inhibited in the cutting operation of the unnecessary section of the final product, and the production efficiency of the hollow product can be improved remarkably with reducing of the production cost.

What is claimed is:

1. A process for producing a hollow molded article having an open end by blow-molding, comprising:
    setting a resin parison in cavity formed by a pair of metal mold members,
    blowing a pressurized gas into the resin parison to form an intermediate molded article, and
    cutting a predetermined part of the intermediate molded article with forward or backward movement of a cutting means which is movable reciprocally across the cavity.

2. A process according to the claim 1, wherein the cutting means is attached to one of the metal mold members and is movable reciprocally in a cross direction relative to the longitudinal or axial direction of the cavity.

3. A process according to the claim 1, wherein the cutting means is guided movably along a groove or slit formed in the metal mold members.

4. A process according to the claim 1, wherein
    the cutting means comprises a blade constructed and arranged so as to be movable in an across direction relative to the axial direction of the intermediate molded article, and
    at least one end of the intermediate molded article is cut by the blade.

5. A process for cutting an unnecessary portion(s) of a hollow molded article in a metal mold, comprising:
    setting a resin parison in cavity formed by a pair of metal mold members,
    closing the metal mold members and blowing a pressurized gas into the resin parison to expand and form an intermediate molded article, and
    cutting a predetermined part of the intermediate molded article with forward movement of a blade which is constructed and arranged to move across the cavity.

6. A blow-molding apparatus for producing a hollow molded article, comprising:
    a pair of metal mold members which are constructed and arranged so that they can be opened and with respect to each other to form a cavity for accommodating a resin parison,
    an arrangement for blowing a pressurized gas into the resin parison to form an intermediate molded article,
    a cutting means, which is constructed and arranged so as to be movable reciprocally across the cavity, for cutting a predetermined part of the intermediate molded article, and
    a reciprocating means for reciprocating the cutting means.

7. A blow-molding apparatus according to the claim 6, wherein
    the inner wall of the metal mold members has a groove or slit therein extending in a cross direction relative to the axial direction of the intermediate molded article, and
    the cutting means comprises a cutter unit for cutting the intermediate molded article and an actuating means for actuating the cutter unit to move in a forward or backward direction along the groove or slit.

8. A blow-molding apparatus according to the claim 7, wherein the groove or slit is formed at a position of the inner wall corresponding to an end or edge of a final molded article.

9. A blow-molding apparatus according to the claim 7, wherein the cutter unit has a circular hollow blade.

10. A blow-molding apparatus according to the claim 7, wherein the cutter unit has an inclined or curved blade which contacts pointedly or in point or linearly substantially with the surface of the intermediate molded article.

11. A blow-molding apparatus according to the claim 6, further comprising:
    a stopper constructed and arranged so as to be displaceable forward or backward against an end of the resin parison and closable tightly the end of the resin parison in association with the mold members, and
    a control unit for controlling the forward or backward movement of the cutting means in response to the backward or forward movement of the stopper relative to the intermediate molded article, wherein the forward displacement of the stopper regulates the advancement of the cutting means and the backward displacement of the stopper allows to move the cutting means forward.

* * * * *